(12) United States Patent
Phan

(10) Patent No.: US 6,579,101 B2
(45) Date of Patent: Jun. 17, 2003

(54) BASIC MATHEMATICS TEACHING AND LEARNING AID

(76) Inventor: Que N. Phan, 1798 Donna La., #2, San Jose, CA (US) 95124-3019

(*) Notice: Subject to any disclaimer, the term of this patent is extended or adjusted under 35 U.S.C. 154(b) by 87 days.

(21) Appl. No.: 09/846,964

(22) Filed: May 1, 2001

(65) Prior Publication Data

US 2002/0009697 A1 Jan. 24, 2002

Related U.S. Application Data

(60) Provisional application No. 60/201,334, filed on May 2, 2000.

(51) Int. Cl.$^7$ ............................................. G09B 19/02
(52) U.S. Cl. ...................................... 434/188; 434/209
(58) Field of Search ............................... 434/188, 189, 434/191, 196, 209, 210

(56) References Cited

U.S. PATENT DOCUMENTS

| | | | |
|---|---|---|---|
| 1,163,125 A | 12/1915 | Bechmann | |
| 1,400,887 A | 12/1921 | Liebman | |
| 3,500,558 A | * 3/1970 | Matejczyk | 434/189 |
| 3,722,110 A | * 3/1973 | Morrisey | 434/189 |
| 4,372,742 A | * 2/1983 | Wentworth | 434/199 |
| 4,445,865 A | 5/1984 | Sellon | |
| 5,083,793 A | * 1/1992 | Sanford | 273/249 |
| 5,759,041 A | 6/1998 | Batten | |
| 5,997,305 A | 12/1999 | Mangles | |
| 6,089,871 A | * 7/2000 | Jaffe | 434/209 |

* cited by examiner

Primary Examiner—Derris H. Banks
Assistant Examiner—Kurt Fernstrom

(57) ABSTRACT

A basic mathematics teaching and learning aid comprises of nine arrays of square spaces placed with powers of 10 from $10^{-4}$ to $10^6$, numbers formed by repeated addition of some of those powers of ten, and other numbers. Dot and dash are in some of square spaces. Numbers, sign, arrows, mathematical symbols, percentages, equations and condition are in open spaces among the arrays. Formation, presentation and relations among these numbers, dots, dashes, sign, arrows, mathematical symbols, percentages, equations and condition are primarily used as an aid in teaching and learning fundamental areas of basic mathematics which mainly includes numbers in base-ten number system, addition, subtraction, multiplication, division, relations of a number of n with zero (number 0) in mathematical operations, whole numbers, fractions, and percentage.

12 Claims, 7 Drawing Sheets

BASIC MATHEMATICS TEACHING AND LEARNING AID

CROSS-REFERENCE TO RELATED APPLICATIONS

This application is entitled to the benefit of Provisional Patent Application No. 60/201,334 filed on May 2, 2000.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The present invention relates to an educational aid used in teaching and learning basic mathematics.

Prior art known to Applicant discloses that there has been many inventions of appliances, devices, apparatuses, aids . . . which have been used to help teach and learn basic mathematics. Following are some of most related inventions which may be of interest regarding the present invention:

"Educational Appliance", U.S. Pat. No. 1,163,125 to A. Bechmann in Dec. 7, 1915.

"Educational Device", U.S. Pat. No. 1,400,887 to H. Liebman in Dec. 20, 1921.

"Method of Teaching Mathematics", U.S. Pat. No. 4,445,865 to J. Sellon in May 1, 1984.

"Mathematics Teaching Device", U.S. Pat. No. 5,759,041 to B. Batten in Jun. 2, 1998.

"Flexible Planar Apparatus", U.S. Pat. No. 5,997,305 to L. Mangles in Dec. 7, 1999.

All of above inventions present something similar to times table with indicators (sticks, pins, colored transparent strips, or tip of a pencil . . . ) or hand folding (U.S. Pat. No. 5,997,305 ) used to locate product for two given factors. Some of inventions above are also used to teach addition, subtraction and division.

While times table and similar devices have been known and used for a long time, and partially accomplished some of objects and advantages in teaching and learning basic mathematics, they present a number of drawbacks. First, times table and similar devices require users to know concepts of horizontal, vertical and intersection or/and use indicators (sticks, pins, colored transparent strips . . . ) in order to find product of two factors. This requirement obviously makes it harder for the users to learn basic mathematics, especially for the young ones, for they have to learn many new things at the same time. Moreover, horizontal, vertical and intersection are concepts in higher level of mathematics, so it is not suitable to use them in teaching basic mathematics. Second, times table and similar devices show the users how to memorize but do not promote how to basically understand numbers, mathematical operations and relationship among them. For example, the users memorize that product of two factors 3 and 2 is 6 just because number 6 locates at intersection of "3" row and "2" row. Third, times table and similar devices have been primarily used to teach multiplication, maybe division also. Thus, they are proved not to be effective in teaching and learning other areas of basic mathematics. Presented are just some of the drawbacks of times table and similar devices.

Accordingly, it is seen that there exists a need to have a new educational aid which will overcome the drawbacks of the times table and similar devices, and be efficient in teaching and learning fundamental areas of basic mathematics.

BRIEF SUMMARY OF THE INVENTION

The present invention is based on base-ten number system with power of ten "$10^a$" where "a" is an integer with range from minus infinitive to plus infinitive.

Powers of ten locate in a plane in such a way that they form an array with powers of ten consecutively ranging from minus infinitive to plus infinitive in directions from right to left on horizontal rows, and from bottom to top on vertical rows. Preferred embodiment of the present invention is based on said plane and framed by 6×6 array of powers of ten:

$$\begin{array}{cccccc} 10^6 & 10^5 & 10^4 & 10^3 & 10^2 & 10^1 \\ 10^5 & 10^4 & 10^3 & 10^2 & 10^1 & 10^0 \\ 10^4 & 10^3 & \mathbf{10^2} & \mathbf{10^1} & 10^0 & 10^{-1} \\ 10^3 & 10^2 & \mathbf{10^1} & \mathbf{10^0} & 10^{-1} & 10^{-2} \\ 10^2 & 10^1 & 10^0 & 10^{-1} & 10^{-2} & 10^{-3} \\ 10^1 & 10^0 & 10^{-1} & 10^{-2} & 10^{-3} & 10^{-4} \end{array}$$

Powers of ten in the above array are then expanded, regrouped and placed in arrays of square spaces which are separated from one another with same distance. Nine arrays with rows and columns of square spaces are arranged as below, and referred as bottom right, bottom, bottom left, right, center, left, top right, top and top left arrays, in order from right to left and from bottom to top, respectively:

$$\begin{array}{ccc} (2\times 2) & (2\times 10) & (2\times 2) \\ (10\times 2) & (10\times 10) & (10\times 2) \\ (2\times 2) & (2\times 10) & (2\times 2) \end{array}$$

Formation, presentation and relations of numbers or numbers, dots and dashes inside and among square spaces of the arrays as well as with numbers, mathematical symbols, arrows, percentages, sign, equations and condition in open spaces among said arrays are used in teaching and learning fundamental areas of basic mathematics which mainly includes numbers in base-ten number system (1, 2, 3, . . . ), addition, subtraction, multiplication, division, relations of a number with zero (number 0) in mathematical operations, whole numbers, fractions, and percentage.

Following are advantages of the present invention regarding to disadvantages of the related inventions identified in section 'Background Of The Invention':

In stead of using indicators (sticks, pins, . . . ), hand folding or/and concepts of vertical, horizontal and intersection to locate product of two factors, as with times table or similar devices, lines of same small numbers in center array of the preferred embodiment place small numbers, used as factors, next on the right and on the bottom of big number, used as product, in each square space. Product of two factors is not just accepted and memorized but it can be reasoned and proved. For example, big number 6 and 2 small numbers 2 and 3 on its right and on its bottom in same square space can be used in 6=2×3 (2 and 3 as factors) or 6=2+2+2 (2 as addend with notice that 2 is added 3 times to make 6) or 6=3+3 (3 as addend with notice that 3 is added 2 times to make 6). Also, 6=4+2 and 6−8=2 are resulted from subtraction of big numbers 4 and 8 with small number 2's in right and left square spaces of same row. Number 6 is also resulted from subtraction and addition of numbers in top and bottom square spaces of same column. Times of number 2 in [6=2+2+2] and times of number 3 in [6=3+3] can also be used to present 6/3=2 and 6/2=3.

Thus, big number 6 with two small numbers 2 and 3 in same square space are not just used to be accepted and memorized only as "6 is product of 2 and 3", but are partially used to promote a basic understanding of relationship among numbers 6, 2, 3, 4, 8 . . . , especially 6, 2, 3, and among operations 3×2=6, 2+2+2=6, 3+3=6, 4+2=6, 8−2=6, 6/3=2 and 6/2=3. Advantages of the present invention regarding to disadvantages of identified related inventions are obvious, and in these respects, the present invention substantially departs from the conventional concepts, designs, and methods of use of the prior art, to provide a new educational aid used in teaching and learning fundamental areas of basic mathematics.

Accordingly, besides objects and advantages described above, several objects and advantages of the present invention are:

(a) to provide a new educational aid;
(b) to provide a new educational aid which can be used in teaching and learning fundamental areas of basic mathematics;
(c) to provide a basic mathematics teaching and learning aid which can be used to promote minimum requiring of necessary means for teaching and basic mathematical knowledge for learning fundamental areas of basic mathematics;
(d) to provide a basic mathematics teaching and learning aid which can be used to promote basic understanding of relationship among numbers in base-ten number system as well as among basic mathematical operations;
(e) to provide a basic mathematics teaching and learning aid which can be used to promote basic understanding of meanings of basic mathematics operations;
(f) to provide a basic mathematics teaching and learning aid which can be used to promote basic preparation for teaching and learning mathematics at a higher level than basic mathematics.
(g) to provide a basic mathematics teaching and learning aid which can be manufactured with ease, readily available material, low cost and convenience for packaging and transporting;

Other objects and advantages of the present inventions are to provide a basic mathematics teaching and learning aid which is simple, compact, portable, reliable, inexpensive to the buying public, and can be used to promote wide popularizing of basic mathematics mass education.

Further objects and advantages of the present inventions will become apparent from a consideration of the accompanying drawings and following description.

Figure 2:
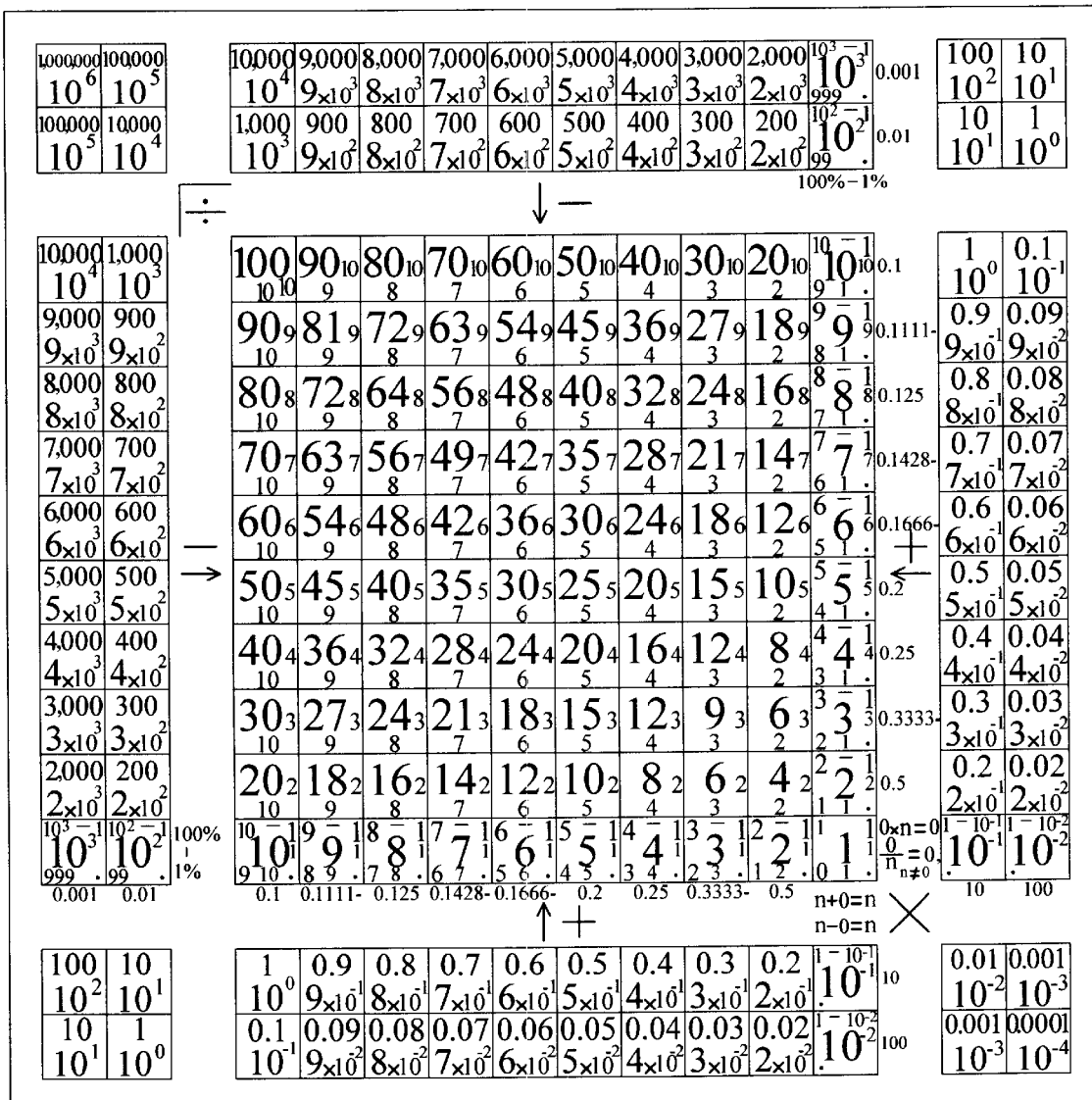
FIG. 2 shows a plan view of the preferred embodiment of the present invention.
Figure 2A:
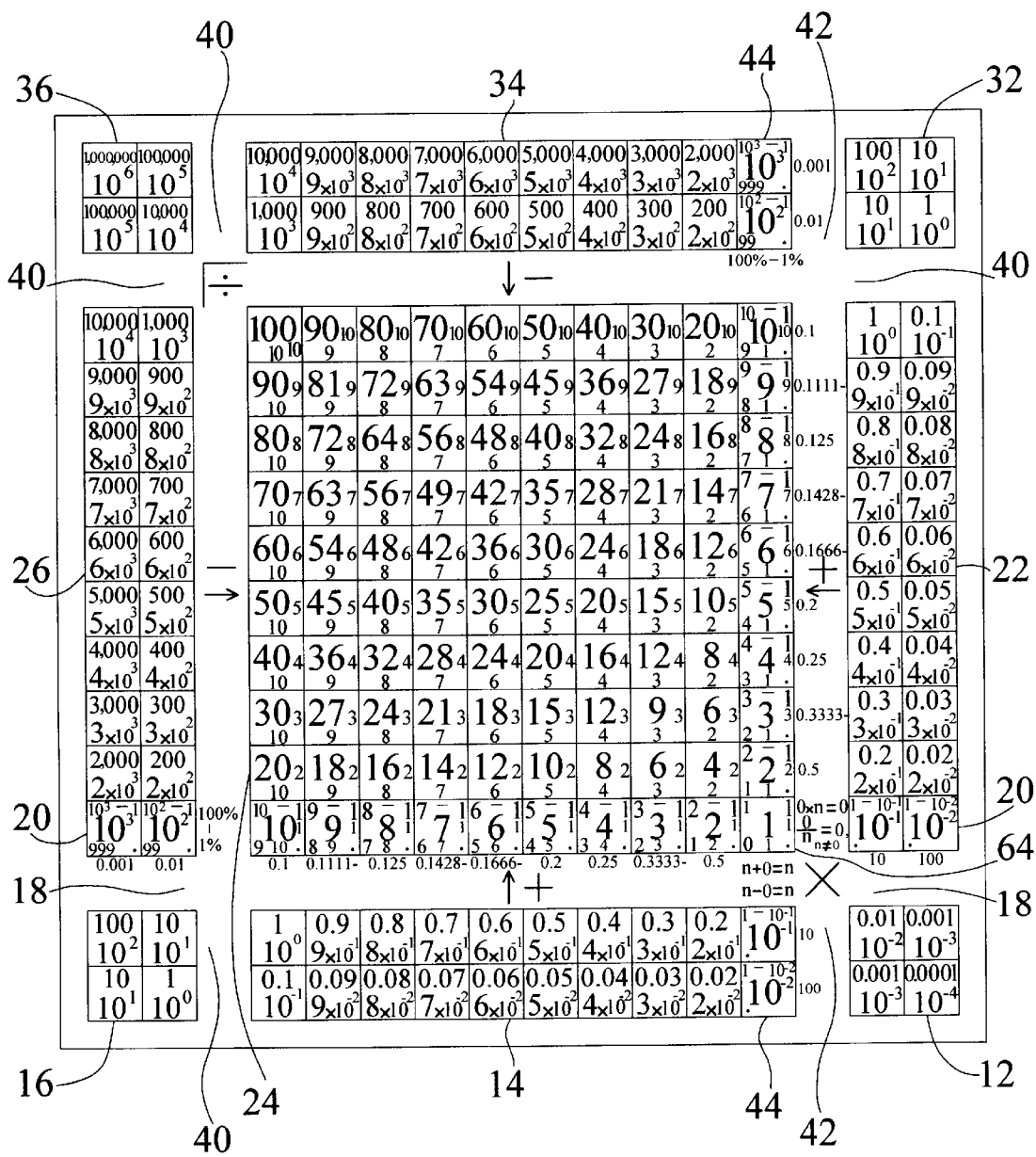
FIG. 2A shows a plan view of the preferred embodiment with reference numerals.

DETAILED DESCRIPTION OF THE INVENTION (a) Reference Numerals In FIG. 2A:

12, 14, 16: bottom right, bottom, and bottom left arrays with (2 row×2 column), (2 row×10 column), and (2 row×2 column) of square spaces, respectively.

22, 24, 26: right, center, and left arrays with (10 row×2 column), (10 row×10 column), and (10 row×2 column) of square spaces, respectively.

32, 34, 36: top right, top, and top left arrays with (2 row×2 column), (2 row×10 column), and (2 row×2 column) of square spaces, respectively.

44: first columns of square spaces from right of arrays 14, 24, and 34.

20: first rows of square spaces from bottom of arrays 22, 24, and 26.

64: intersection or common square space of column 44 and row 20.

40: open space among arrays, not in any array.

42: open space between column 44 and arrays 12, 22, and 32

18: open space between row 20 and arrays 12, 14, and 16

(b) Description of the Preferred Embodiment of the Present Invention: (FIG. 1, FIG. 2, FIG. 2A, and FIG. 2B).

Figure 1:
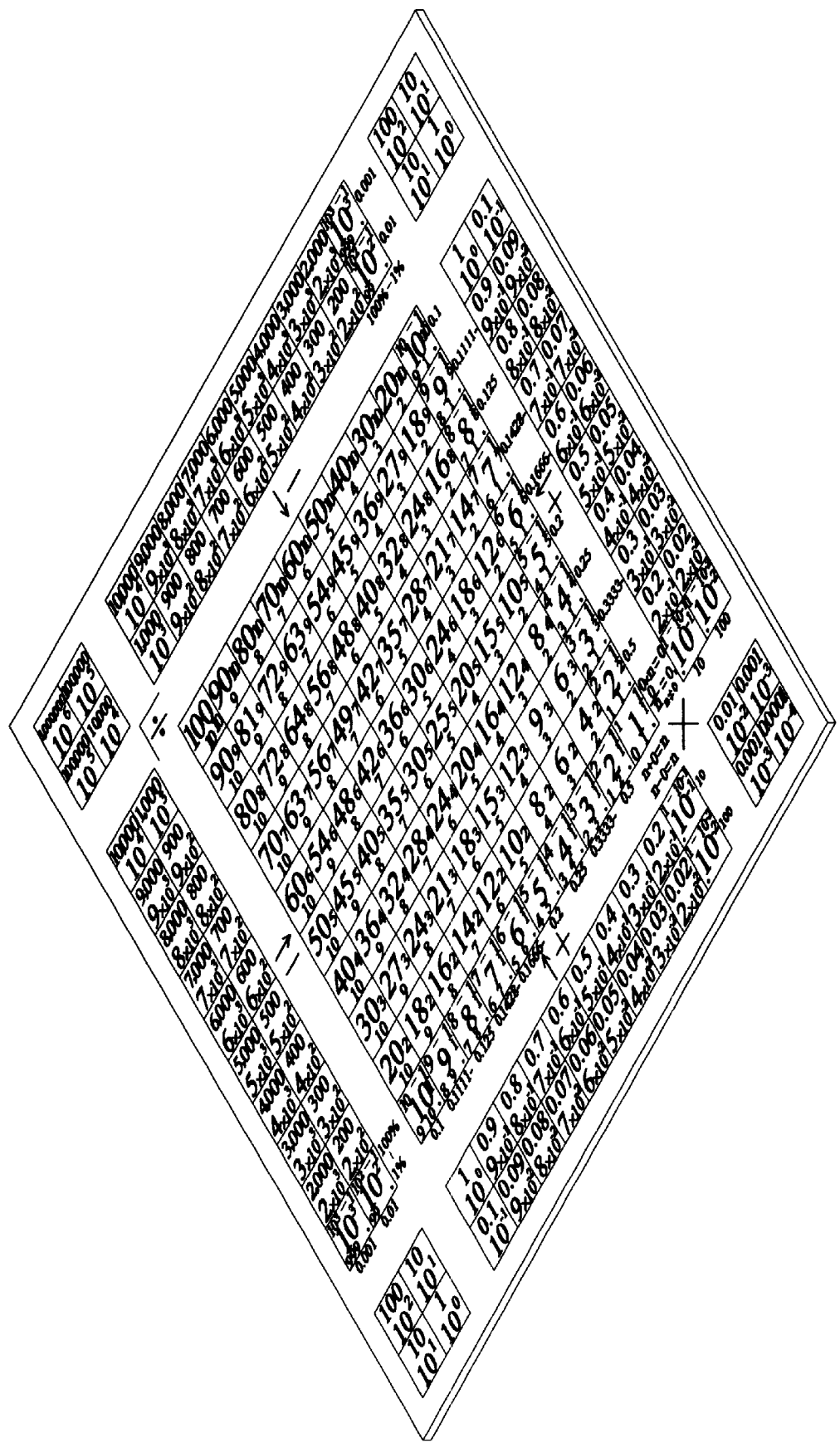
FIG. 1 shows an isometric view of the preferred embodiment of the present invention.

The preferred embodiment of the invention is illustrated in FIG. 1 (isometric view), FIG. 2 (plane view ), and FIG. 2A (plan view with reference numerals). The preferred embodiment is made of flexible plastic or suitable material with suitable length, height, and thickness to carry information as illustrated in FIG. 1, FIG. 2, and FIG. 2A.

In portion on the right of array 24, each of ten square spaces of column 44 is placed at center with each of ten numbers from 1, 2, 3, . . . to 10 in direction from bottom to top, respectively. In each of nine square spaces of column 44, already having numbers from 2, 3, . . . to 10, on top of each of those numbers, a pair of smaller numbers with a dash ("-") in between, from "2-1", "3-1", to "10-1" is placed, respectively. Dash is situated right on top of the big number, two small numbers are situated at top left and top right corners in each square space. As for square space with big number 1, only a small number 1, is placed at top right corner, in same square space. On bottom of each of big numbers from 1, 2, 3, . . . to 10, pair of a small number and a period or dot ("."), from "0 .", "1 .", "2 .", . . . to "9 .", is placed with small number and dot situated at bottom left and bottom right corners in each square space, respectively.

In portion on bottom of array 24, except square space 64, each of nine square spaces of row 20 is placed at center with each of nine numbers from 2, 3, . . . to 10 in direction from right to left, respectively. In each of nine square spaces of row 20, already having numbers from 2, 3, . . . to 10, on top of each of those numbers, a pair of smaller numbers with a dash ("-") in between, from "2-1", "3-1", . . . to "10-1" is placed, respectively. Dash is situated right on top of the big number, two small numbers are situated at top left and top right corners in each square space. On bottom of each of big numbers from 2, 3, . . . to 10, pair of a small number and a period or dot ("."), from "1 .", "2 .", ... to "9 .", is placed with small number and dot situated at bottom left and bottom right corners in each square space, respectively. Thus, only one small number or dash or dot is situated at one in 8 positions: on top, on bottom, on the right, on the left of the big number, at bottom right, at top right, at top left, and at bottom left corner in same square space.

Accordingly, except small numbers, dashes, and dots, big numbers in square spaces of column 44 and row 20, portions in array 24, except big number 1, are formed by repeated addition by itself or arithmetically increasing of big number 1 ($10^0$) in square space 64 up and to the left. If (big) number 10 is already in square space at the end of the column or row, then repeated addition by itself of (big) number 1 just fill the square spaces in between with (big) numbers from 2 9, or continue to overwrite (big) number 10.

Big numbers in other square spaces of array 24 are also formed by repeated addition by itself either to the left of each big number in square spaces of column 44 in array 24 or up (or to the top) of each big number in square spaces of row 20 in array 24, except big number 1 in square space 64. After the repeated addition, array 24 has four powers of ten $10^0$, $10^1$, $10^2$, $10^1$, presenting in decimal form, 1, 10, 100, 10, in bottom right, top right, top left and bottom left square spaces, respectively.

In order to show how big numbers in square spaces of column 44 or row 20 perform repeated addition to form other big numbers in square spaces of array 24, lines of same small numbers in same row and column are formed. These small numbers are placed on the right and on bottom of big numbers in square spaces of array 24.

Thus, each square space of array 24 has a big number at center, a small number on the right and other small number on bottom of the big number. Same small numbers on the right of big numbers in same row are same with big number in square space of column 44 in same row. For example: same small number 9's on the right of big numbers 90, 81, 72, 63, 54, 45, 36, 27, 18 and 9, in same row, are same with big number 9 in square space of column 44 in same row. Same small numbers on bottom of big numbers in same column are same with big number in square space of row 20 in same column. For example: same small number 3's on bottom of big numbers 30, 27, 24, 21, 18, 15, 12, 9, 6, and 3, in same column, are same with big number 3 in square space of row 20 in same column.

Each big number in each square space of array 24, excluding big numbers in square spaces of column 44 and row 20, is moved up and to the left a little bit so that two other small numbers can comfortably fit within same square space.

Small numbers on the right and on bottom of the big number in each square space of column 44 and row 20 in array 24 can be resized to fit within same square space.

In square space at top left corner of array 24, small number 10 on the right of the big number 100 is moved downward a little bit to fit within same square space.

Four powers of ten $10^2$, $10^3$, $10^4$ and $10^3$ are placed in four square spaces of array 26, in bottom right, top right, top left and bottom left square space, respectively. Bottom right and bottom left square spaces are also in row 20. Powers of ten $10^2$ and $10^3$ in bottom right and bottom left square spaces each performs repeated addition by itself up or to the top to form other numbers in other square spaces of array 26.

Four powers of ten $10^2$, $10^3$, $10^4$ and $10^3$ are placed in four square spaces of array 34, in bottom right, top right, top left and bottom left square spaces, respectively. Bottom right and top right square spaces are also in column 44. Powers of ten $10^2$ and $10^3$ in bottom right and top right square spaces each performs repeated addition by itself to the left to form other numbers in other square spaces of array 34.

Four powers of ten $10^{-2}$, $10^{-1}$, $10^0$, and $10^{-1}$ are placed in four square spaces of array 22, in bottom right, top right, top left and bottom left square spaces, respectively. Bottom right and bottom left square spaces are also in row 20. Powers of ten $10^{-2}$ and $10^{-1}$ in bottom right and bottom left square spaces each performs repeated addition by itself up or to the top to form other numbers in other square spaces of array 22.

Four powers of ten $10^{-2}$, $10^{-1}$, $10^0$, and $10^{-1}$ are placed in four square spaces of array 14, in bottom right, top right, top left and bottom left square spaces, respectively. Bottom right and top right square spaces are also in column 44. Powers of ten $10^{-2}$ and $10^{-1}$ in bottom right and top right square spaces each performs repeated addition by itself to the left to form other numbers in other square spaces of array 14.

Four powers of ten $10^{-4}$, $10^{-3}$, $10^{-2}$, and $10^{-3}$ are placed in four square spaces of array 12, in bottom right, top right, top left and bottom left square spaces, respectively.

Four powers of ten $10^0$, $10^1$, $10^2$, and $10^1$ are placed in four square spaces of array 16, in bottom right, top right, top left and bottom left square spaces, respectively.

Array 32 is identical to array 16.

Four powers of ten $10^4$, $10^5$, $10^6$, and $10^5$ are placed in four square spaces of array 36, in bottom right, top right, top left and bottom left square spaces, respectively.

Excluding numbers in square spaces of column 44 and row 20, number in each square space of arrays 12, 14, 16, 22, 26, 32, 34, and 36 is presented in two forms: decimal form and exponential form. This results in having two numbers in each square space: upper number in decimal form and lower number in exponential form.

Same as other numbers in other square spaces of row 20 in array 24, on top of each of two big numbers $10^3$ and $10^2$ in two square spaces of row 20 in array 26, a pair of smaller numbers with a dash ("-") in between, "$10^3$-1" and "$10^2$-1", is placed, respectively. Dash is situated right on top of the big number, two small numbers are situated at top left and top right corners in each square space. On bottom of each of big numbers, pair of a small number and a period or dot ("."), "999 ." and "99 .", is placed with small number and dot situated at bottom left and bottom right corners in each square space, respectively.

Two square spaces of column 44 in array 34 from bottom to top are identical with two square spaces of row 20 in array 26 from right to left, respectively.

On top of each of two big numbers $10^{-1}$ and $10^{-2}$ in two square spaces of row 20 in array 22, a pair of smaller numbers with a dash ("-") in between, "1-$10^{-1}$" and "1-$10^{-2}$", is placed, respectively. Dash is situated right on top of the big number, two small numbers are situated at top left and top right corners in each square space. At bottom left corner of each square space, a period or dot (".") is placed.

Two square spaces of column 44 in array 14 from bottom to top are identical with two square spaces of row 20 in array 22 from right to left, respectively.

Symbol of addition and arrow pointing to the left are placed in open space 42, between arrays 22 and 24, next to the right of two square spaces of column 44 with big numbers 5 and 6 at center. Another symbol of addition and arrow pointing to the top are placed in open space 18, between arrays 14 and 24, on bottom of two square spaces of row 20 with big numbers 5 and 6 at center. Symbol of subtraction and arrow pointing to the right are placed in open space 40, between arrays 26 and 24, next to the left of two square spaces of array 24 with big numbers 50 and 60 at center. Another symbol of subtraction and arrow pointing to the bottom are placed in open space 40, between arrays 34 and 24, next on top of two square spaces of array 24 with big numbers 50 and 60 at center. Symbol of multiplication is placed at center of intersection of open spaces 42 and 18, among arrays 12, 14, 24, and 22. A sign, formed by two short vertical and horizontal lines situating at top left of division symbol, and the division symbol are placed in open space 40, among arrays 24, 26, 36 and 34.

Percentages of 100 and 1 with a little horizontal line in between are placed in open space 40, right on bottom of square space with big number $10^2$ of column 44. Other percentages of 100 and 1 with a little vertical line in between, are placed in open space 40, next to the right of square space with big number $10^2$ of row 20.

Quotients resulted from "1" as dividend with each big number in each square space of column 44 and row 20 as divisor, excluding square space 64, are placed in open space 42, next to each square space of column 44 on the right, and in open space 18, right on bottom of each square space of row 20, accordingly. Each of numbers presenting those quotients, except round ones, has four digits to the right of decimal point and a dash ("-") replacing repeating digits, and is not rounded off. Quotient resulted from "1" as dividend with big number 1 in square space 64 as divisor, which is 1, is placed at top left corner in square space 64 (small number 1).

Two equations, n+0=n and n−0=n, are placed on bottom of square space 64, in open space 18, the former on top and the latter on bottom.

Two equations, n×0=0 , 0/n=0, and condition n≠0 for the latter equation are placed on the right of square space 64, in open space 42, in order, top, middle and bottom, respectively.

It is preferable:

On area of other suitable sides of the preferred embodiment, other information as in Table 2D can be placed. In 'Table 2D', quotients resulted from "1" as dividend with each number from 1, 2, 3, . . . to 10, as divisor are placed in first column on the right of "equal" symbols ("="), on bottom and in same column with number 1. Multiples of each quotient are placed in same row, and each is placed on bottom and in same column with each number of 2, 3, . . . to 10, accordingly, or till equal to one (1). Numbers presenting the quotients and their multiples, except round ones, have four digits to the right of decimal point and a dash ("-") replacing repeating digits, and are not rounded off.

TABLE 2D

Number zero (0) on the left of decimal point of each of the quotients and their multiples is omitted.

|  | 1 | 2 | 3 | 4 | 5 | 6 | 7 | 8 | 9 | 10 |
|---|---|---|---|---|---|---|---|---|---|---|
| 1 ÷ 10 = | .1 | .2 | .3 | .4 | .5 | .6 | .7 | .8 | .9 | 1 |
| 1 ÷ 9 = | .1111− | .2222− | .3333− | .4444− | .5555− | .6666− | .7777− | .8888− | 1 | |
| 1 ÷ 8 = | .125 | .25 | .375 | .5 | .625 | .75 | .875 | 1 | | |
| 1 ÷ 7 = | .1428− | .2857− | .4285− | .5714− | .7142− | .8571− | 1 | | | |
| 1 ÷ 6 = | .1666− | .3333− | .5 | .6666− | .8333− | 1 | | | | |
| 1 ÷ 5 = | .2 | .4 | .6 | .8 | 1 | | | | | |
| 1 ÷ 4 = | .25 | .5 | .75 | 1 | | | | | | |
| 1 ÷ 3 = | .3333− | .6666− | 1 | | | | | | | |
| 1 ÷ 2 = | .5 | 1 | | | | | | | | |
| 1 ÷ 1 = | 1 | | | | | | | | | |

Numbers, dashes, dots, mathematical symbols, arrows, percentages, sign, equations and condition in square spaces and in open spaces of the preferred embodiment can be applied with different colors and sizes as well as adjusted in such a way that facilitates understanding of the users and is still within scope of the present invention.

(c) Description of First Alternative Embodiment

Figure 3:
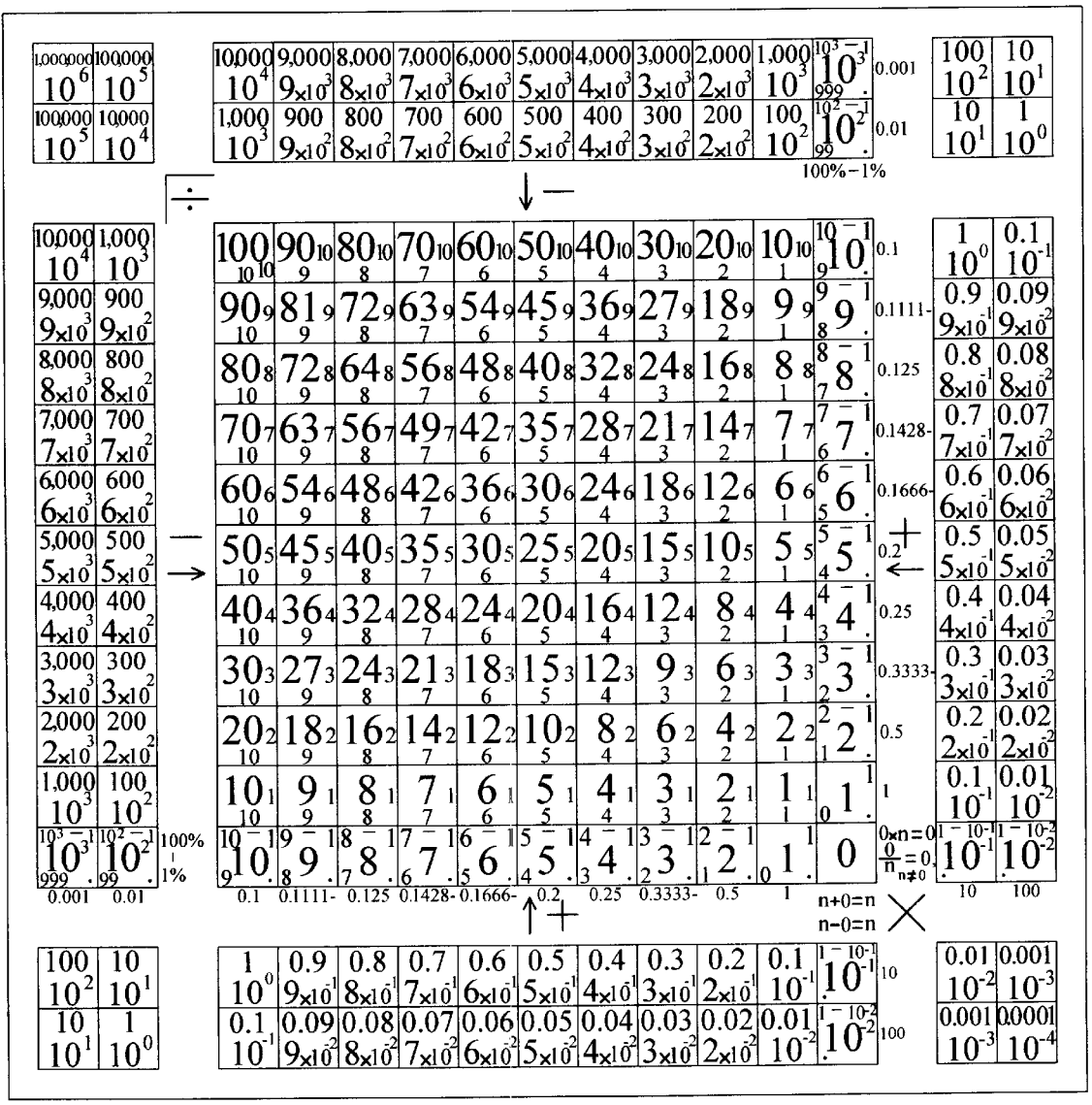
FIG. 3 shows a plan view of first alternative embodiment.

FIG. 3 and FIG. 2A)

From the preferred embodiment, one column of square spaces with big numbers identical to big numbers of column 44 is placed next to column 44 to the right One row of square spaces with big numbers identical to big numbers of row 20 is placed next to row 20 on bottom. Thus, arrays 12, 22, 32, and everything in open spaces 42 have to move to the right, and arrays 12, 14, 16, and everything in open spaces 18 have to move downward so that open spaces 18 and 42 are still as before. Then, all small numbers at corners, dash, and dot in each square space of column 44 are moved to next square space to the right in same row in same positions. All small numbers at corners, dash, and dot in each square space of row 20 are moved down to next square space on bottom in same column in same positions. Small numbers at corners and dot in square space 64 with big number 1 are copied and moved two times, to the right and down. Each big number in each square space of row 20 and column 44, portions in arrays 22, 26, 14, and 34 is then presented in two forms: decimal form and exponential form. Thus, each square space of row 20 and column 44, portions in arrays 22, 26, 14, and 34 has two numbers: upper number in decimal form and lower number in exponential form. Number zero (0) is placed at center in new square space formed at intersection of new column and row with big numbers identical to big numbers of column 44 and row 20.

Nine arrays with rows and columns of square spaces of the first alternative embodiment with reference numerals are:

- 12, 14, 16: bottom right, bottom, and bottom left arrays with (2 row×2 column), (2 row×11 column), and (2 row×2 column) of square spaces, respectively.
- 22, 24, 26: right, center, and left arrays with (11 row×2 column), (11 row×11 column), and (11 row×2 column) of square spaces, respectively.
- 32, 34, 36: top right, top, and top left arrays with (2 row×2 column), (2 row×11 column), and (2 row×2 column) of square spaces, respectively.
- 44: first columns of square spaces from right of arrays 14, 24, and 34.
- 20: first rows of square spaces from bottom of arrays 22, 24, and 26.
- 64: intersection or common square space of column 44 and row 20.
- 40: open space among arrays, not in any array.
- 42: open space between column 44 and arrays 12, 22, and 32
- 18: open space between row 20 and arrays 12, 14, and 16

Numbers, mathematical symbols, arrows, sign, percentage, equations and condition are adjusted. For example: Small number 1 at top left corner of square space with big number 1 of column 44 in array 24 is moved outside to open space 42, next to the right of same square space. Small number 1 at top left corner of square space with big number 1 of row 20 in array 24 is moved outside to open space 18, next on bottom of same square space. Two equations, n+0=n and n−0=n, are moved to next on bottom of square space 64. Two equations, n×0=0, 0/n=0, and condition n≠0 are moved down next on the right of square space 64. Percentages of 100 and 1 with a little horizontal line in between are moved to next on bottom of square space with big number $10^2$ of column 44 in array 34. Other percentages of 100 and 1 with a little vertical line in between are moved down next on the right of square space with big number $10^2$ of row 20 in array 26. Symbols of addition and subtraction, and arrows in open spaces are moved so that they are in same row and column of square spaces with same small number 5's of array 24. Symbol of multiplication still at intersection of open spaces 18 and 42, among arrays 12, 14, 24, and 22.

Figure 4:
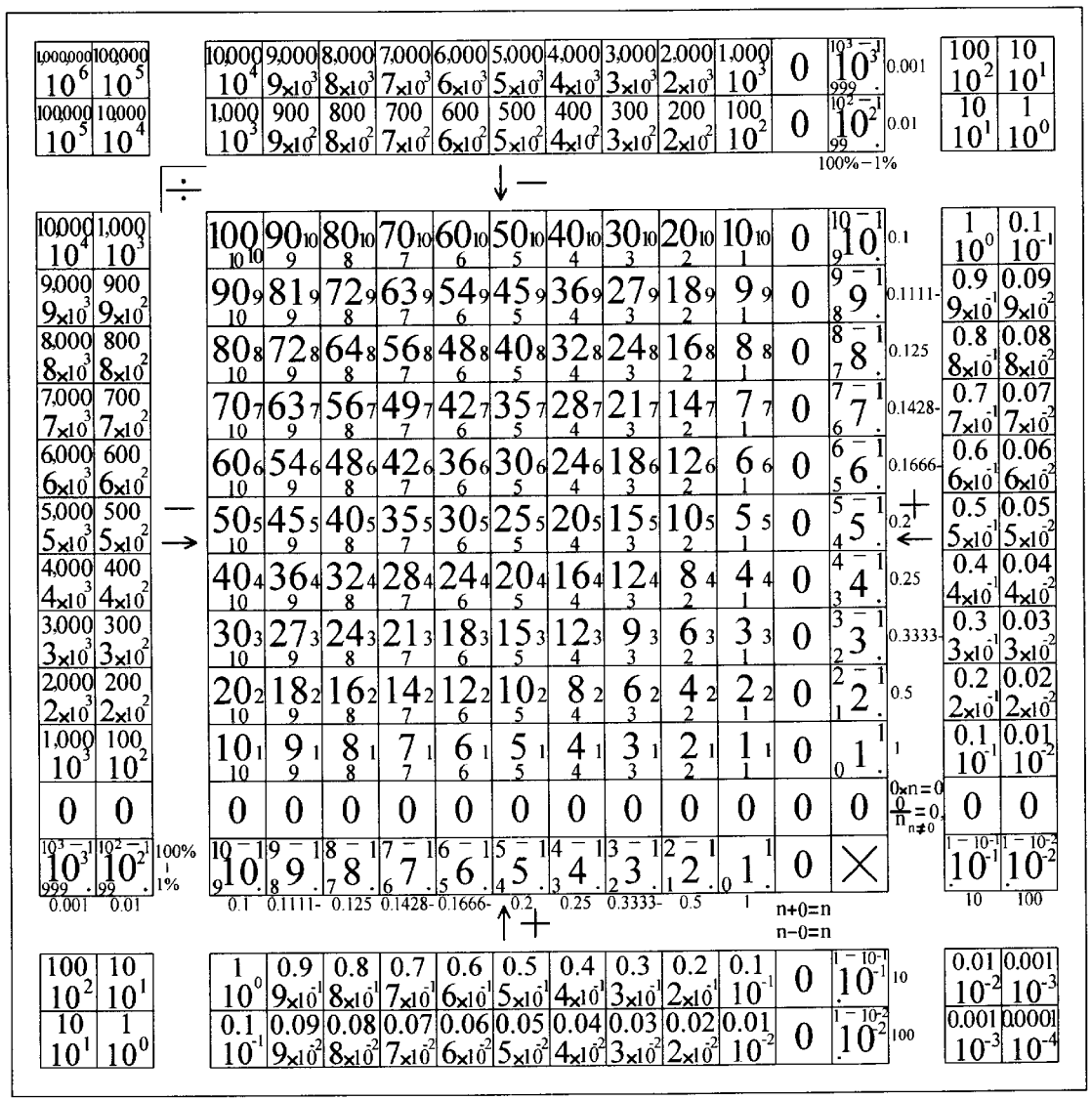
FIG. 4 shows a plan view of second alternative embodiment.

(d) Description of Second Alternative Embodiment (FIG. 3, FIG. 4, and FIG. 2A)

Referring to first alternative embodiment (FIG. 3 and FIG. 2A) One column of square spaces with big numbers zero's (0's) is placed next to column 44 to the left. One row of square spaces with big numbers zero's (0) is placed next to row 20 on top. Thus, arrays 12, 22, 32 and everything in open spaces 42 have to move to the right, and arrays 12, 14, 16, and everything in open spaces 18 have to move downward so that open spaces 18 and 42 are still as before.

Nine arrays with rows and columns of square spaces of the second alternative embodiment with reference numerals are:

- 12, 14, 16: bottom right, bottom, and bottom left arrays with (2 row×2 column), (2 row×12 column), and (2 row×2 column) of square spaces, respectively.
- 22, 24, 26: right, center, and left arrays with (12 row×2 column), (12 row×12 column), and (12 row×2 column) of square spaces, respectively.
- 32, 34, 36: top right, top, and top left arrays with (2 row×2 column), (2 row×12 column), and (2 row×2 column) of square spaces, respectively.
- 44: first columns of square spaces from right of arrays 14, 24, and 34.
- 20: first rows of square spaces from bottom of arrays 22, 24, and 26.
- 64: intersection or common square space of column 44 and row 20.
- 40: open space among arrays, not in any array.
- 42: open space between column 44 and arrays 12, 22, and 32
- 18: open space between row 20 and arrays 12, 14, and 16

Square space 64 is now placed with symbol of multiplication. Equations, n+0=n and n−0=n, are in open space 18 and in same column with zero column. Equations, 0×n=0, 0/n=0 and condition n≠0 are in open space 42 and in same row with zero row.

In center of the plane with squares and each defined by four numbers, "$10^a$", "$10^{a+1}$", "$10^{a+2}$", and "$10^{a+1}$" at four corners, bottom right, top right, top left, and bottom left corner, respectively, two pairs of identical numbers of "$10^a$" with numbers of 0 in between intersect at location with number 0 at center, four numbers 0's at four sides, and four numbers of $10^0$ each presented as 1 at four corners with the number 1 on bottom right corner replaced with symbol of multiplication, as shown below and in FIG. 4.

```
1 0 1
0 0 0
1 0 X
```

Powers of ten in a plane will be shown in detail at the end of section 'Operation' of the following.

Figure 2B:
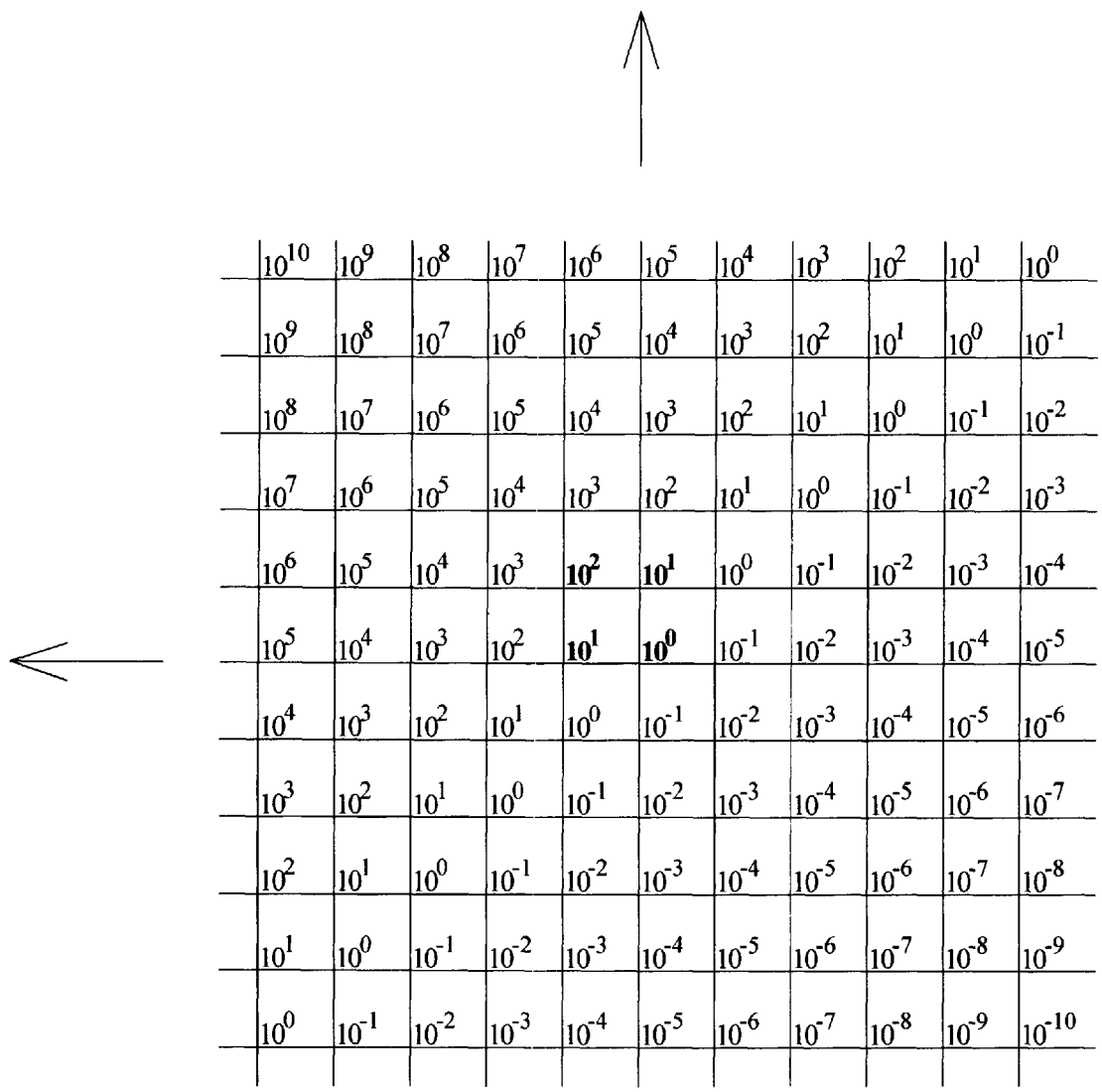
FIG. 2B shows portion of squares, each defined by four powers of ten, "$10^a$", "$10^{a+1}$", "$10^{a+2}$", and "$10^{a+1}$" in a plane.

(e) Operation:

Operation of The Preferred Embodiment (FIG. 2, FIG. 2A, and FIG. 2B).

Referring to FIG. 2 and FIG. 2A of the preferred embodiment of the present invention:

In array 24, big numbers from 1 to 10 in square spaces of column 44 and row 20 are used as whole numbers. The big numbers 1 and 10 are also considered as $10^0$ and $10^1$, base 10 with powers 0 and 1. Big numbers and small numbers in square spaces of array 24 are used as whole numbers in:

(1) Addition Operation for Numbers in Square Spaces of Same Row

The big number and small number on the right in each square space of array 24 are used as addends to make sum which is big number in next square space to the left in same row, as defined by addition symbol and arrow pointing to the left in open space 42, between arrays 24 and 22. The small number on bottom of the big number in each square space is used to indicate times the small number on the right added together to make sum which is the big number in same square space.

For example, referring to square space in sixth column from left and fifth row from bottom, in the middle of array 24, with big number 25 at center and two small number 5's on the right and on bottom, the small number 5 on bottom is used to in indicate that five small number 5's on the right of the big number are added together to make sum which is the big number 25. The big number 25 is result from adding between big number 20 and small number 5 on the right of the big number 20, in next square space on the right, in same row. After the adding, small number 4, on bottom of the big number 20, is raised one and becomes small number 5 on bottom of the big number 25, in next square space to the left. Likewise, the big number 25 and small number 5 on the right are added together to make sum which is big number 30 in next square space to the left, in same row. After adding, smaller number 5 on bottom of the big number 25 is raised one and becomes small number 6 on bottom of the big number 30, in next square space to the left. Four small number 5's added together to make sum 20, five small number 5's to make sum 25, and six small number 5's to make sum 30, are shown in three square spaces, from right to left in same row, respectively. Sum of the big number and small number on the right as addends in each square space of first column from left of array 24 is not shown.

(2) Addition Operation for Numbers in Square Spaces of Same Column

The big number and small number on bottom in each square space of array 24 are used as addends to make sum which is big number in next square space up on top in same column, as defined by addition symbol and arrow pointing to the top in open space 18, between arrays 24 and 14. The small number on the right of the big number in each square space is used to indicate times the small number on bottom added together to make sum which is the big number in same square space.

For example, referring to square space in first column from left and fifth row from bottom of array 24 with big number 50 at center, small number 5 on the right and small number 10 on bottom, the small number 5 on the right is used to in indicate that five small number 10's on bottom of the big number are added together to make sum which is the big number 50. The big number 50 is result from adding between big number 40 and small number 10 on bottom of the big number 40 in bottom square space, in same column. After the adding, small number 4, on the right of the big number 40, is raised one and becomes small number 5 on the right of big number 50, in next square space up on top. Likewise, the big number 50 and small number 10 on bottom are added together to make sum which is big number 60 in next square space up on top, in same column. After adding, smaller number 5 on the right of the big number 50 is raised one and becomes small number 6 on the right of the big number 60, in next square space up on top. Four small number 10's added together to make sum 40, five small number 10's to make sum 50, and six small number 10's to make sum 60 are shown in three square spaces from bottom to top in same column, respectively. Sum of the big number and small number on bottom as addends in each square space of first row from top of array 24 is not shown.

(3) Subtraction Operation for Numbers in Square spaces of Same Row

The big number and small number on the right in each square space of array 24 are used as minuend and subtrahend to make difference which is big number in next square space to the right in same row, as defined by subtraction symbol and arrow pointing to the right in open space 40, between arrays 26 and 24 (The small number on bottom of the big number in each square space is used to indicate times the small number on the right added together to make sum which is the big number in same square space).

For example, referring to square space in sixth column from left and fifth row from bottom, near the middle of array 24 with big number 25 at center and two small number 5's on the right and on bottom, the big number 25 is difference resulted from subtracting between big number 30 as minuend, and small number 5 on the right of the big number 30 as subtrahend, in next square space on the left in same row. After the subtracting, small number 6 on bottom of the big number 30 is decreased one and becomes small number 5 on bottom of the big number 25, in next square space to the right. Likewise, the small number 5 on the right of big number 25 is subtracted from big number 25 to make difference which is big number 20 in next square space to the right, in same row. After subtracting, small number 5 on bottom of the big number 25 is decreased one and becomes small number 4 on bottom of the big number 20 in next square space to the right. 30 subtracts 5 to make 25. 25 subtracts 5 to make 20. Three big numbers, 30, 25 and 20 are shown in three square spaces from left to right, respectively. Difference of the big number as minuend and small number on the right as subtrahend in each square space of column 44 in array 24 is zero and not shown.

(4) Subtraction Operation for Numbers in Square Spaces of Same Column

The big number and small number on bottom in each square space of array 24 are used as minuend and subtrahend to make difference which is big number in next square space on bottom, in same column, as defined by subtraction symbol and arrow pointing to the bottom in open space 40, between arrays 34 and 24 (The small number on the right of the big number in each square space is used to indicate times the small number on bottom added together to make sum which is the big number in same square space).

For example, referring to square space in first column from left and fifth row from bottom of array 24 with big number 50 at center, small number 5 on the right and small number 10 on bottom, the big number 50 is result from subtracting between big number 60 as minuend, and small number 10 on bottom of the big number 60 as subtrahend, in top square space in same column. After subtracting, small number 6, on the right of the big number 60, is decreased one and becomes small number 5 on the right of big number 50 in next square space on bottom in same column. Likewise, the small number 10 on bottom of big number 50 is subtracted from big number 50 to make difference which is big number 40 in next square space on bottom, in same column. After subtracting, smaller number 5 on the right of the big number 50 is decreased one and becomes small number 4 on the right of the big number 40, in next square space on bottom in same column. 60 subtracts 10 to make 50. 50 subtracts 10 to make 40. Three big numbers, 60, 50, and 40 are shown in three square spaces, from top to bottom in same column, respectively. Difference of the big number as minuend and small number on bottom as subtrahend in each square space of row 20 in array 24 is zero and not shown.

Addition and subtraction of numbers in the same row or column are used as repeated addition and repeated subtraction.

Two equations, n+0=n and n−0=n, placed in open space 18 on bottom of square space 64, are used to indicate that, for any number of n, n plus zero or n minus zero is still equal to number n, respectively.

(5) Multiplication Operation

In each square space of array 24, small number on the right and small number on bottom of big number are used as factors, and the big number is used as product of these two factors. When compared with repeated addition of numbers in same row, the small numbers on the right and on bottom of the big number are multiplicand and multiplier, respectively. When compared with repeated addition of numbers in same column, the small numbers on the right and on bottom of the big number are multiplier and multiplicand, respectively. Then the big number is product of these multiplicand and multiplier.

The equation, 0×n=0, placed next to square space 64 in open space 42, is used to indicate that, in multiplication operation, any number of n multiplied with number zero (0), then the product of that number n and number zero is equal to zero.

Symbol of multiplication is placed at intersection of open spaces 42 and 18, among arrays 24, 22, 12, and 14.

(6) Division Operation

As an inverse process of multiplication, in each square space of array 24, big number is used as dividend and small numbers are used as divisor and quotient. When compared with repeated subtraction of numbers in same row, the small numbers on the right and on bottom of the big number are divisor and quotient with meanings that each time small number on the right is subtracted, small number on bottom is decreased one to become small number on bottom of the big number in next square space to the right, in same row. In the same meanings, when compared with repeated subtraction of numbers in same column, the small numbers on the right and on bottom of the big number are quotient and divisor.

The equation, 0/n=0, and condition, n≠0, placed next to square space 64 in open space 42, are used to indicate that, in division operation, if the divisor is not equal to zero, then the quotient is equal to zero when the dividend is equal to zero.

Symbol of division is placed in open space 40, among arrays 24, 26, 36, and 34. The sign formed by two short vertical and horizontal lines at top left of the division symbol is used to remind of two small numbers, on the right and on bottom of the big number, in each square space of array 24.

Numbers in square spaces of arrays 12, 14, 16, 22, 26, 32, 34, and 36 can also be used in addition, subtraction, multiplication and division operations in an analogy way with big numbers and small numbers in square spaces of array 24.

1 Addition and Subtraction Operations for Numbers in Square Spaces in Same Row or Column Number in each square spaces of arrays 14, 22, 26, and 34, except numbers in square spaces of column 44 and row 20, is presented in two forms in same square space, upper number in decimal form and lower number in exponential form. Lower numbers in square spaces of first columns from left of arrays 14 and 34, and first rows from top of arrays 22 and 26 are presented in the form of "$10^{a+1}$". Big numbers in square spaces of outer right columns of arrays 14 and 34, and first rows from bottom of arrays 22 and 26, also in column 44 and row 20, are presented in the form of "$10^a$" with no upper decimal form.

For example: Numbers in top row of array 34 are presented as:

| 10,000 | 9,000 | 8,000 | ... | 3,000 | 2,000 | – |
|---|---|---|---|---|---|---|
| $10^4$ | $9\times10^3$ | $8\times10^3$ | ... | $3\times10^3$ | $2\times10^3$ | $10^3$ |

If numbers (or number) in each square spaces of arrays 14, 22, 26, and 34, excluding small numbers at corners (and dash, dot) in square spaces of column 44 and row 20, are (or is) brought to the same form of a number b multiplied by $10^a$ for lower number and a decimal form of ($b \times 10^a$) for upper number, then three numbers, "b" (number from 1, 2 ,3 . . . to 10), $10^a$ (a : integer {−∞, +∞}), and decimal form of ($b \times 10^a$), can be used in an analogy way with small numbers and big number in each square space of array 24 in addition and subtraction of numbers in same row or column.

For example: Numbers in top row of array 34 used in example above can be presented as:

| 10,000 | 9,000 | 8,000 | ... | 3,000 | 2,000 | 1,000 |
|---|---|---|---|---|---|---|
| $10\times10^3$ | $9\times10^3$ | $8\times10^3$ | ... | $3\times10^3$ | $2\times10^3$ | $1\times10^3$ |

It is noticeable that small numbers on the right and on bottom of big number in each square space in array 24 are whole numbers while $10^a$ in ($b \times 10^a$) is presented in exponential form.

Thus, three numbers, "b", $10^a$, and decimal form of ($b \times 10^a$) can also be used in multiplication and division operations of numbers in same square space.

2 Multiplication and Division Operations

In a similar way, if numbers in each square space of arrays 12, 16, 32, and 36 are brought to the form ($b \times 10^a$) for lower number and a decimal form of ($b \times 10^a$) for upper number, then three numbers, "b", $10^a$, and decimal form of ($b \times 10^a$) can be used in an analogy way as small numbers and big number in each square space of array 24 in multiplication and division of numbers in same square space.

(7) Whole Numbers

Each big number in each square space of column 44 and row 20, portions in array 24, has a small number at bottom left corner in same square space. This number is used to remind of whole number(s) existing (if there is one) between two big numbers in two square spaces next to each other in same row or same column of array 24. This number is also used to remind of whole number(s) existing (if there is one) between number zero (0) (not shown) and big number in each square space of column 44 and row 20 in array 24.

In first row from bottom of array 24, or row 20 in array 24, no whole number exists between two any big numbers in two square spaces next to each other in same row, and no whole number exists between zero (0) (not shown) and big number 1, so at bottom left corner of square space with big number 1 of column 44 or square space 64, small number zero (0) is placed. In second row from bottom of array 24, one whole number exists between two big numbers in two square spaces next to each other. For example, on the right side of the row, one whole number, number 3, exists between two big numbers 2 and 4 in two square spaces next to each other in same row; on the left side of the row, one whole number, number 19, exists between two big numbers 18 and 20 in two square spaces next to each other in same row; or one whole number, number 1, exists between number zero (0) (not shown) and big number 2 in square space of column 44 in same row. So, at bottom left corner of square space with big number 2 of column 44 in same row, small number 1 is placed. In top row of array 24, nine whole numbers exist between two big numbers in two square spaces next to each other. For example, nine whole numbers from 11, 12, 13, 14 . . . to 19 exist between two big numbers 10 and 20, or nine whole numbers from 1, 2, 3, 4 . . . to 9 exist between number zero (0) (not shown) and big number 10. So, at bottom left corner of square space with big number 10 of column 44 in same row, small number 9 is placed.

In the same manner, in first column from right of array 24, or column 44 in array 24, no whole number exists between two any big numbers in two square spaces next to each other in same column, and no whole number exists between number zero (0) (not shown) and big number 1, so at bottom left corner of square space with big number 1 of row 20 or square space 64, small number "0" is placed. In second column from left of array 24, eight whole number exists between two big numbers in two square spaces next to each other in same column. For example, eight whole numbers, from 82, 83, 84, . . . to 89, exist between big numbers 81 and 90 on top of the column; or eight whole numbers, from 1, 2, 3, . . . to 8, exist between number zero (0) (not shown) and number 9, on bottom of the column. So, at bottom left corner of square space with big number 9 of row 20 in same column, small number 8 is placed.

Small numbers 99 and 999 at bottom left corners in lower and upper square spaces of column 44, portion on the right of array 34, are used in same way: 99 whole numbers exist between number zero (0) (not shown) and number 100 or $10^2$, and 999 whole numbers exist between number zero (0) (not shown) and number 1,000 or $10^3$. Between two numbers in two square spaces next to each other in same row, 99 (in lower row), or 999 (in upper row) whole numbers exist. Numbers in square spaces of array 34 are whole numbers presented in decimal and exponential forms.

Small numbers 99 and 999 at bottom left corners in right and left square spaces of row 20, portion on bottom of array 26, are used in same way as same numbers in square spaces of column 44 described above for numbers in square spaces of same column. Numbers in square spaces of array 26 are whole numbers presented in decimal and exponential forms.

(8) Fractions

Each big number, except big number 1, in each square space of column 44 and row 20, portions in array 24, has a pair of small numbers with a dash in between on top of it in same square space. Numbers presented by that pair of small numbers are used with the big number to form fractions, proper fraction(s) and fraction with value equal to one. Denominators in those fractions are same as the big number and numerators are numbers presented by that pair of small numbers. For example, numbers 1, 2, 3, 4 and 5 presented by pair of small numbers "5-1" on top big number 5, are used with the big number 5 to form proper fractions $\frac{1}{5}$, $\frac{2}{5}$, $\frac{3}{5}$, $\frac{4}{5}$ and fraction $\frac{5}{5}$. For square space 64 with big numbers 1, the big number 1 and small number 1 at top right corner are used to form fraction $\frac{1}{1}$, equal to 1 and placed at top left corner (small number 1) in same square space. Quotients in decimal forms of "1" as dividend with each big number in each square space of column 44, except square space 64, as divisor are placed next to column 44, in open space 42, between arrays 24 and 22, accordingly; quotients in decimal forms of "1" as dividend with each big number in each square space of row 20, except square space 64, as divisor are placed next to row 20 on bottom in open space 18, between arrays 24 and 14, accordingly. Numbers presenting these quotients and their multiples (in Table 2D), except round ones, have four digits to the right of decimal point and a dash ("-"), replacing repeating digits, and are not rounded off. These numbers can be used together with other numbers to get decimal forms of fractions and mixed numbers without using hand calculator in simple calculations. How these numbers are rounded off depends on each need of users.

The fractions formed from big number and pair of small numbers in each square space of column 44 and row 20 in array 24, except square space 64, are also used to combine with whole numbers of array 24 (shown and not shown) to form improper fractions and mixed numbers.

For example: $35 \times \frac{1}{4} = 35/4$ (number 35 is in square space of fifth row from bottom, seventh column from right of array 24)

$33 + \frac{3}{4} = 33\frac{3}{4}$ (number 33 is not shown in array 24)

Pair of small numbers on top of big number in each square space of column 44 and row 20, portions in arrays 34 and 26 respectively, is also used in the same way for fractions, except that, one small number of the pair and the big number in each square space are presented in exponential form. Referring to other square spaces in same row (for square spaces of column 44 in array 34), or in same column (for square spaces of row 20 in array 26), other similar numbers presented in decimal form as whole numbers can be found.

Pair of small numbers on top of big number in each square space of column 44 and row 20, portions in arrays 14 and 22 respectively, is also used in the same way for fractions, except that, one small number of the pair and the big number in each square space are presented in exponential forms which result in complex fractions with decimal or fraction in the denominator or in both numerator and denominator. For example, $\frac{1}{10^{-1}}$, $\frac{1}{0.1}$, $\frac{0.1}{0.1}$. Referring to other square spaces in same row (for square spaces of column 44 in array 14), or in same column (for square spaces of row 20 in array 22), other similar numbers presented in decimal form can be found; or each quotient of $\frac{1}{10^{-1}}$ and $\frac{1}{10^{-2}}$ presenting complex fraction as whole number is placed next to each square space on the right, in open space 42 (for square spaces of column 44 in array 14), and next to each square space on bottom, in open space 18 (for square spaces of row 20 in array 22), accordingly.

(9) Decimal Point and Percentage

Decimal Point

Each big number in each square space of column 44 and row 20, excluding portions in arrays 14 and 22, has a dot (".") at bottom right corner in same square space. This dot is used to remind of decimal point placed on the right of ones digit and on the left of fraction part in a decimal number. In case no fraction part, decimal point is omitted. This period is also used as a reference for place value of digits on the left and digits on the right as of decimal point. In square spaces with big numbers $10^{-1}$ and $10^{-2}$ of column 44 in array 14 and of row 20 in array 22, dots are placed at bottom left corners to indicate those big numbers presenting decimal fractions.

Percentage

Percentages of 100 and 1, with a little horizontal line in between are placed in open space 40, near intersection of open spaces 40 and 42, right on bottom of square space with big number $10^2$ of column 44. Other percentages of 100 and 1 with a little vertical line in between, are placed in open space 40, next to the right of square space with big number $10^2$ of row 20. These percentages are used to compare and convert between fractions, decimals, and percentages.

For example: $\frac{1}{10^2}$ to $10^2/10^2$, $\frac{1}{100}$ to $\frac{100}{100}$, 0.01 to 1, and 1% to 100%

(10) Relation Among Arrays (Referring to FIG. 2, FIG. 2A, and FIG. 2B).

Relation between arrays are based on power of ten "$10^a$" where "a" is an integer with range from minus infinitive to plus infinitive ($\{-\infty, +\infty\}$). Power of ten "$10^a$" is used in a plane with grid at background. One of horizontal line of the grid is used as horizontal axis. Power of ten $10^0$ is placed at an intersection of the horizontal axis and a vertical line of the grid. In the plane, increasing directions of powers of ten are to the left and up or to the top. From location of $10^0$ on the horizontal axis, where "a" is equal to zero, power of ten "$10^a$" increases to infinite ($\infty$) to the left and at the same time, decreases to minus infinite ($-\infty$) to opposite direction, to the right. Each power of ten is located at an intersection of horizontal axis with each vertical line of the grid, consecutively, as shown below and in FIG. 2B:

$$\ldots 10^5 \ 10^4 \ 10^3 \ 10^2 \ 10^1 \ 10^0 \ 10^{-1} \ 10^{-2} \ 10^{-3} \ 10^{-4} \ 10^{-5} \ldots$$

Then all the powers of ten on the horizontal axis both increase up to the top, and decrease down to bottom at same time such that powers of ten are located at intersections of horizontal lines with vertical lines of the grid. Thus, an array of powers of ten is formed with powers of ten consecutively ranging from minus infinitive to plus infinitive in direction from right to left on horizontal rows, and from bottom to top on vertical rows. Infinite squares are formed and each square is defined by four powers of ten, "$10^a$", "$10^{a+1}$", "$10^{a+2}$", and "$10^{a+1}$", at four corners, bottom right, top right, top left, and bottom left corner, respectively, as shown in FIG. 2B with four powers of ten high-lighted. Increasing directions, up and to the left, make number (decimal form for power of ten) at bottom right corner in each square one-hundredth of the number at top left corner, and the number at top right corner equal to the number at bottom left corner. At any power of ten "$10^a$", next number to the left or up is "$10^{a+1}$", and next number to the right or down is "$10^{a-1}$". The repeated addition of number "$10^0$" up and/or to the left, as well as the repeated addition of other numbers are used to form big numbers in array 24 (FIG. 2). Small numbers and others are added to array 24 for other purposes of the preferred embodiment as explained in 'Operation' from (1) to (9).

Array 24: (Referring to 'Operation', (1) to (6))

Arrays 12, 16, 32, and 36

In these arrays, upper or lower number in each square space is one-tenth of the upper or lower number in next square space straight up or to the left in same array or in other array, or ten times of the upper or lower number in next square space straight down or to the right in same array or in other array, respectively.

For numbers in square spaces of column 44 and row 20, big number in each square space is used in according with upper or lower number in next square space up, down, to the left or to the right in other arrays.

Arrays 14 and 34

Each big number in each square space of column 44, portions in array 14 and 34, is used in repeated addition by itself to the left to a number, ten times of it and in same row, in square space of first columns from left of these arrays. So, upper or lower number in each square space of arrays 14 and 34 is one-tenth of the upper or lower number in next square space straight up in same array, and in next square space straight up or to the left in other arrays, respectively. Upper or lower number in each square space is ten times of the upper or lower number in next square space straight down in same array, and in next square space straight down or to the right in other arrays, respectively.

Arrays 26 and 22

Each big number in each square space of row 20, portions in array 22 and 26, is used in repeated addition by itself to the top to a number, ten times of it and in same column, in square space of first rows from top of these arrays. So, upper or lower number in each square space of arrays 22 and 26 is one-tenth of the upper or lower number in next square space straight to the left in same array, and in next square space straight to the left or up in other arrays, respectively. Upper or lower number in each square space is ten times of the upper or lower number in next square space straight to the right in same array, and in next square space straight to the right or down in other arrays, respectively.

For numbers in square spaces of array 24, big number in each square space of outer rows and columns is used in according with upper or lower number in next square space up, down, to the left or to the right, in other arrays.

Each square space in each array has a symmetrical square space through diagonal line from bottom right vertex of array 12 to top left vertex of array 36, excluding square spaces situated on that line.

Operation for The First and Second Alternative Embodiments (FIG. 3, FIG. 4, FIG. 2A, and FIG. 2B)

Operation for the first and second alternative embodiments is in same manner with operation for the preferred embodiment.

Column 44 and row 20 of the first alternative embodiment (FIG. 3) are added to mainly make room for small numbers at corners, dashes, and dots in square spaces of column 44 and row 20 of the preferred embodiment to move to, so the operation does not change. The phrase: "Excluding square spaces with big numbers in column 44 and row 20 . . ." is used where applicable.

With column and row of zero's (0's), the second alternative embodiment (FIG. 4) has some minor differences in operation. For example: In subtraction operation for numbers in the same row, difference of the big number as minuend and small number on the right as subtrahend in each square space of third column from right is zero and shown (compared with "not shown" in 'Operation' for the preferred embodiment). Number zero (0) used in finding whole numbers is shown, compared with "not shown" in section '7 Whole numbers' of 'Operation' for the preferred embodiment. The phrase: "Excluding square spaces with big numbers in column 44 and row 20, and zeros in . . ." is used where applicable.

(f) Conclusion and Ramification (FIG. 2, FIG. 3, FIG. 4, FIG. 2A, FIG. 2B, and FIG. 2C)

In consideration of the drawings and description above, it is apparent that the basic mathematics teaching and learning aid of the present invention can be used as an aid to teach and learn basic mathematics simply, clearly, easily, and conveniently. In an unprecedented way, it concretely uses what is known to teach what is unknown. It mathematically provides simple steps to show how one thing is made from another one in basic mathematics, and basically how they are related to one another. By that way, it is much easier for the users, especially the young ones, to learn basic mathematics.

In order to help illustrate the preferred embodiment, alternative embodiments, and some aspects in constructing the present invention, the description above relates the present invention to many specificities These should not be considered as limits to the scope of the present invention. The size, color, arrangement, and uses of the preferred embodiment presented in the description can be adjusted, changed or modified in such a way that is still within the scope of present invention. For examples:

All arrays 12, 14, 16, 22, 26, 32, 34, and 36 can be moved closer to or father from array 24. Other symbols for multiplication and division can be used. The symbols of addition, subtraction, multiplication, and division, as well as the arrows can be placed anywhere in open spaces 40, 42, and 18, in such a way that facilitates understanding of the users.

Square spaces in each array can be separated from one another by an equal substantial distance. Small numbers in each square space of array 24 can be relocated at other positions in same square space or outside in open space among square spaces.

The square spaces in arrays used to convey information can be in any shape, such as polygon, circular, oval, etc.

Increasing direction of number "$10^a$" in a plane or in three-dimensional space can be of any direction.

Two or four squares, each defined by four powers often, "$10^a$", "$10^{a+1}$", "$10^{a+2}$", and "$10^{a+1}$" at four corners with expanding numbers like array 24, next to each other can be presented in an embodiment.

Figure 2C:
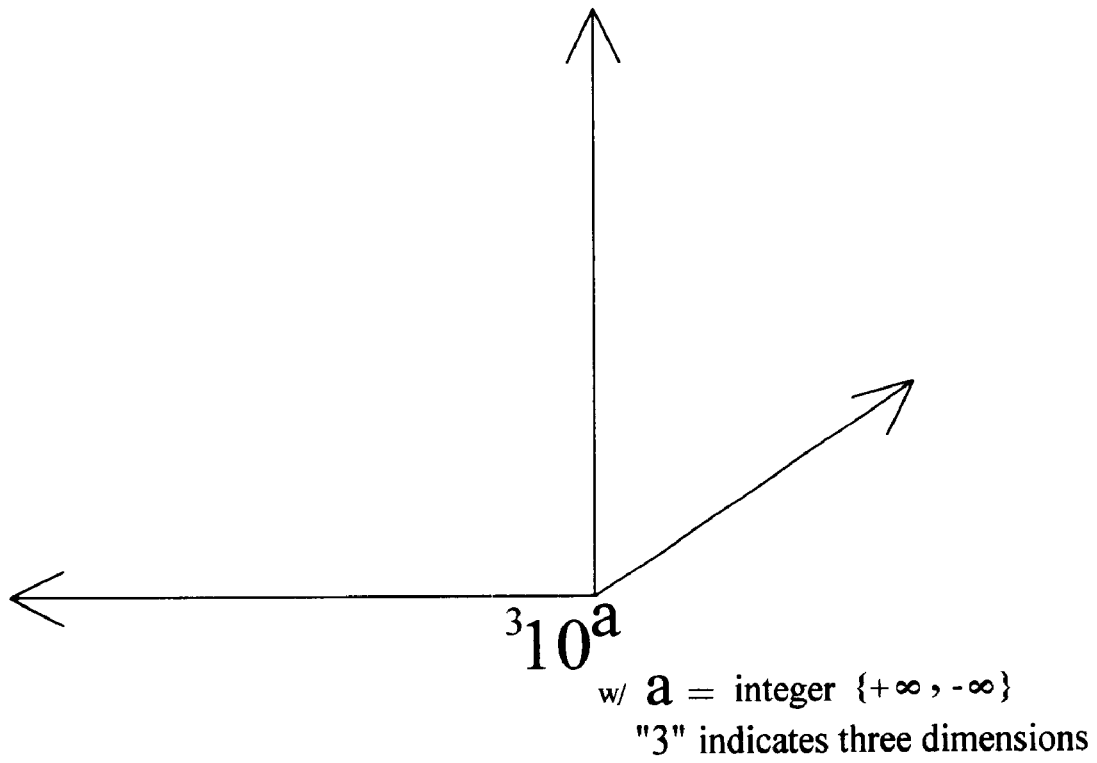
FIG. 2C shows symbol of "$^3 10^a$" presenting powers of ten in three-dimensional space.

The preferred embodiment can be modified to apply in three-dimensional space as illustrated in FIG. 2C.

Multiples of each number in open spaces 42 and 18, except percentages, can be accordingly placed next to that number as long as those open spaces have enough room.

In the second alternative embodiment (FIG. 4), small numbers can be placed in each square space with big number zero (0) of array 24 and of other arrays with compatible using.

The preferred embodiment can be built with enough thickness so that lights can be put under transparent surfaces of square spaces in arrays, and controlled by the users corresponding to functions of the present invention.

Numbers, letters, dashes, dots, arrows, percentages, symbols and sign in the preferred embodiment can be raised or replaced with raised periods (dots) in Braille for the handicapped to use the present invention.

The preferred embodiment can be use to present numbers (1, 2, 3, ... ) in base-ten number system to kindergarten students.

With some modifications, the preferred embodiment can be used as educational game within the scope of the present invention.

Instead of in suitable size for personal use, the preferred embodiment can be made bigger with different suitable material to use with group of users such as in classroom, etc.

Numbers in each square space (and with numbers in other square spaces) are ready for "homework" or practice with mathematical problems and solutions.

The preferred embodiment can be generated by a computer program so that it can be used on screen of a computer. Then, a click of computer mouse on a square space of the preferred embodiment will show how numbers in that square space and with numbers in other square spaces perform mathematical operations, and how they are related to one another. Explanations and answers for questions are also made available.

The preferred embodiment can also be used to replace calculator in daily simple calculations.

Accordingly, the scope of the invention should be determined, not by the specificities in the description and examples given above, but by the appended claims and their legal equivalents.

I claim:

1. A basic mathematics teaching and learning aid, comprising:
   (a) a plurality of arrays of square spaces, each said array having four powers of ten, $10^a$, $10^{a+1}$, $10^{a+2}$, and $10^{a+1}$ placed in four said square spaces at bottom right, top right, top left, and bottom left corners of said array, respectively;
   (b) said a in said four powers of ten, $10^a$, $10^{a+1}$, $10^{a+2}$, and $10^{a+1}$ being an integer in the range from minus infinitive to plus infinitive with consecutively increasing directions being to the left and to the top;
   (c) said arrays being separated from one another by open spaces.

2. The basic mathematics teaching and learning aid of claim 1, wherein one of said arrays has said a equal to zero and is a center array, comprising:
   (a) a plurality of square spaces, each square space having numbers of different print sizes, wherein a big number is located at the center of each said square space and a plurality of small numbers in each said square space wherein each small number is in smaller print than said big number; four powers of ten in four said square spaces at four corners of said center array being four big numbers;
   (b) wherein a small number is located on the right of said big number in each said square space and has a value equal to the big number in the outer right square space of the same row as said square space;
   (c) wherein a small number is located below said big number in each said square space and has a value equal to the big number in the bottom square space of the same column as said square space;
   (d) each said square space of the outer right column and the bottom row of said center array, including the common square space of said outer right column and said bottom row, further has a dot at the bottom right corner, a small number 1 at the top right corner, a small number at the top left corner wherein said small number at said top left corner has a value equal to the big number in same said square space, a small number at the bottom left corner wherein said small number at said bottom left corner has a value equal to said big number minus one, and a dash between two small numbers at said top left corner and said top right corner in same said square space; said dash in said common square space being omitted;
   (e) said big number in each square space of said center array is added with said small number on its right to determine the value of the big number in the adjacent square space to the left of said square space in the same row, and said big number in each square space of said center array is added with said small number below said big number to determine the value of the big number in the adjacent square space above said square space in the same column; the values of four big numbers in four square spaces at four corners of said center array are predetermined by four powers of ten;
   (f) said big number and said small numbers in each square space of said center array being presented in decimal form.

3. The basic mathematics teaching and learning aid of claim 1, wherein one of said arrays has said a equal to −2 and is a bottom array, comprising:
   (a) a plurality of square spaces; wherein each square space of the outer right column having numbers of different print sizes, wherein a big number is located at the center of each said square space and a plurality of small numbers in each said square space wherein each small number is in smaller print than said big number; wherein two powers of ten in two square spaces at the bottom right and top right corners of said bottom array being two big numbers;
   (b) each square space of said outer right column having a dot at the bottom left corner, a small number 1 at the top left corner, a small number at the top right corner wherein said small number at said top right corner being identical to the big number in same said square space, and a dash between two small numbers at said top left corner and said top right corner in same said square space;
   (c) excluding the power of ten numbers in four square spaces at four corners of said bottom array, the value of each power of ten number in each square space of said bottom array is determined by adding the power of ten number in the adjacent square space to the right of said square space with the big number in the outer right square space of the same row as said square space;

(d) excluding the power of ten numbers in the square spaces of said outer right column , each power of ten number in each square space of said bottom array is also presented in decimal form.

4. The basic mathematics teaching and learning aid of claim 1, wherein one of said arrays has said a equal to −2 and is a right array, comprising:

(a) a plurality of square spaces; wherein each square space of the bottom row having numbers of different print sizes, wherein a big number is located at the center of each said square space and a plurality of small numbers in each said square space wherein each small number is in smaller print than said big number; wherein two powers of ten in two square spaces at the bottom right and bottom left corners of said right array being two big numbers;

(b) each square space of said bottom row having a dot at the bottom left corner, a small number 1 at the top left corner, and a small number at the top right corner wherein said small number at said top right corner being identical to the big number in same said square space, and a dash between two small numbers at said top left corner and said top right corner in same said square space;

(c) excluding the power of ten numbers in four square spaces at four corners of said right array, the value of each power of ten number in each square space of said right array is determined by adding the power of ten number in the adjacent square space below said square space with the big number in the bottom square space of the same column as said square space;

(d) excluding the power of ten numbers in the square spaces of said bottom row, each power of ten number in each square space of said right array is also presented in decimal form.

5. The basic mathematics teaching and learning aid of claim 1, wherein one of said arrays has said a equal to 2 and is a left array, comprising:

(a) a plurality of square spaces; wherein each square space of the bottom row having numbers of different print sizes, wherein a big number is located at the center of each said square space and a plurality of small numbers in each said square space wherein each small number is in smaller print than said big number; wherein two powers of ten in two square spaces at the bottom right and bottom left corners of said left array being two big numbers;

(b) each square space of said bottom row having a dot at the bottom right corner, a small number 1 at the top right corner, a small number at the top left corner wherein said small number at said top left corner being identical to the big number in same said square space, a small number in decimal form at the bottom left corner wherein said small number at said bottom left corner has a value equal to said big number minus one, and a dash between two small numbers at said top left corner and said top right corner in same said square space;

(c) excluding the power of ten numbers in four square spaces at four corners of said left array, the value of each power of ten number in each square space of said left array is determined by adding the power of ten number in the adjacent square space below said square space with the big number in the bottom square space of the same column as said square space;

(d) excluding the power of ten numbers in the square spaces of said bottom row, each power of ten number in each square space of said left array is also presented in decimal form.

6. The basic mathematics teaching and learning aid of claim 1, wherein one of said arrays has said a equal to 2 and is a top array, comprising (a) a plurality of square spaces ; wherein each square space of the outer right column having numbers of different print sizes, wherein a big number is located at the center of each said square space and a plurality of small numbers in each said square space wherein each small number is in smaller print than said big number; wherein two powers of ten in two square spaces at the bottom right and top right corners of said top array being two big numbers;

(b) each square space of said outer right column having a dot at the bottom right corner, a small number 1 at the top right corner, a small number at the top left corner wherein said small number at said top left corner being identical to the big number in same said square space, a small number in decimal form at the bottom left corner wherein said small number at said bottom left corner has a value equal to said big number minus one, and a dash between two small numbers at said top left corner and said top right corner in same said square space;

(c) excluding the power of ten numbers in four square spaces at four corners of said top array, the value of each power of ten number in each square space of said top array is determined by adding the power of ten number in the adjacent square space to the right of said square space with the big number in the outer right square space of the same row as said square space;

(d) excluding the power of ten numbers in the square spaces of said outer right column, each power of ten number in each square space of said top array is also presented in decimal form.

7. The basic mathematics teaching and learning aid of claim 1, wherein four of said arrays have said a equal to −4, 0, 4, 0, and are bottom right, top right, top left, and bottom left arrays respectively, each of said arrays comprising a plurality of square spaces wherein each power of ten number in each square space is also presented in decimal form, wherein said power of ten number and the number in said decimal form in same said square space are used in mathematical operations.

8. The basic mathematics teaching and learning aid of claim 1, wherein said open spaces comprising:

(a) a plurality of arrows, a plurality of mathematical symbols of addition and subtraction, a mathematical symbol of multiplication, and a mathematical symbol of division; wherein an arrow pointing to the left and a symbol of addition are paired together and located in the open space between said right array and said center array; wherein an arrow pointing to the top and another symbol of addition are paired together and located in the open space between said bottom array and said center array; wherein an arrow pointing to the right and a symbol of subtraction are paired together and located in the open space between said left array and said center array; wherein an arrow pointing to the bottom and another symbol of subtraction are paired together and located in the open space between said top array and said center array; wherein said symbol of multiplication is located among said bottom right, right, center, and bottom arrays; wherein said symbol of division is located among said center, top, top left, and left arrays;

(b) a sign formed by two short vertical and horizontal lines and located next to said symbol of division;

(c) a plurality of percentages of 100 and a plurality of percentages of 1, wherein a percentage of 100 and a percentage of 1 are paired together with a little horizontal line in between and located in the open space below the square space at the bottom right corner of said top array, wherein another percentage of 100 and another percentage of 1 are paired together with a little vertical line in between and located in the open space next to the right of the square space at the bottom right corner of said left array;

(d) a plurality of quotients; wherein each quotient resulted from 1 as dividend, with each big number in each square space of the outer right columns of said bottom, center, and top arrays as divisor, is placed in the open space next to the right of each said square space accordingly; wherein each quotient resulted from 1 as dividend, with each big number in each square space of the bottom rows of said right, center, and left arrays as divisor, is placed in the open space below each said square space accordingly; wherein each said quotient is presented in decimal form; wherein each said quotient, excluding the round quotients, has a plurality of digits to the right of a decimal point and a dash at the end of said quotient to replace repeating digits, and is not rounded off; wherein the quotient of said 1 as dividend with the big number 1 in the common square space of the outer right column and the bottom row of said center array as divisor is moved into said common square space and being the small number 1 at the top left corner of said common square space of said center array;

(e) a plurality of equations of a number of n with zero, n+0=n, n−0=n, 0×n=0, 0/n=0 and condition n≠0 for the latest equation; wherein said equations are placed in the open spaces next to said common square space of said center array.

9. The basic mathematics teaching and learning aid, comprising:

a plurality of arrays of square spaces, each said array having four powers of ten, $10^a$, $10^{a+1}$, $10^{a+2}$, and $10^{a+1}$ placed in four said square spaces at bottom right, top right, top left, and bottom left corners of said array, respectively; said a in said four powers of ten, $10^a$, $10^{a+1}$, $10^{a+2}$, and $10^{a+1}$ being an integer in the range from minus infinitive to plus infinitive with consecutively increasing directions being to the left and to the top; said arrays being separated from one another by open spaces;

(A) wherein one of said arrays has said a equal to zero and is a center array, comprising:

(a) a plurality of square spaces, each square space having numbers of different print sizes, wherein a big number is located at the center of each said square space and a plurality of small numbers in each said square space wherein each small number is in smaller print than said big number; four powers of ten in four said square spaces at four corners of said center array being four big numbers;

(b) wherein a small number is located on the right of said big number in each said square space and has a value equal to the big number in the outer right square space of the same row as said square space;

(c) wherein a small number is located below said big number in each said square space and has a value equal to the big number in the bottom square space of the same column as said square space;

(d) each said square space of the outer right column and the bottom row of said center array, including the common square space of said outer right column and said bottom row, further has a dot at the bottom right corner, a small number 1 at the top right corner, a small number at the top left corner wherein said small number at said top left corner has a value equal to the big number in same said square space, a small number at the bottom left corner wherein said small number at said bottom left corner has a value equal to said big number minus one, and a dash between two small numbers at said top left corner and said top right corner in same said square space; said dash in said common square space being omitted;

(e) said big number in each square space of said center array is added with said small number on its right to determine the value of the big number in the adjacent square space to the left of said square space in the same row, and said big number in each square space of said center array is added with said small number below said big number to determine the value of the big number in the adjacent square space above said square space in the same column; the values of four big numbers in four square spaces at four corners of said center array are predetermined by four powers of ten;

(f) said big number and said small numbers in each square space of said center array being presented in decimal form;

(B) wherein one of said arrays has said a equal to −2 and is a bottom array, comprising:

(a) a plurality of square spaces; wherein each square space of the outer right column having numbers of different print sizes, wherein a big number is located at the center of each said square space and a plurality of small numbers in each said square space wherein each small number is in smaller print than said big number; wherein two powers of ten in two square spaces at the bottom right and top right corners of said bottom array being two big numbers;

(b) each square space of said outer right column having a dot at the bottom left corner, a small number 1 at the top left corner, and a small number at the top right corner wherein said small number at said top right corner being identical to the big number in same said square space, and a dash between two small numbers at said top left corner and said top right corner in same said square space;

(c) excluding the power of ten numbers in four square spaces at four corners of said bottom array, the value of each power of ten number in each square space of said bottom array is determined by adding the power of ten number in the adjacent square space to the right of said square space with the big number in the outer right square space of the same row as said square space;

(d) excluding the power of ten numbers in the square spaces of said outer right column, each power of ten number in each square space of said bottom array is also presented in decimal form;

(C) wherein one of said arrays has said a equal to −2 and is a right array, comprising:
   (a) a plurality of square spaces; wherein each square space of the bottom row having numbers of different print sizes, wherein a big number is located at the center of each said square space and a plurality of small numbers in each said square space wherein each small number is in smaller print than said big number; wherein two powers of ten in two square spaces at the bottom right and bottom left corners of said right array being two big numbers;
   (b) each square space of said bottom row having a dot at the bottom left corner, a small number 1 at the top left corner, and a small number at the top right corner wherein said small number at said top right corner being identical to the big number in same said square space, and a dash between two small numbers at said top left corner and said top right corner in same said square space;
   (c) excluding the power of ten numbers in four square spaces at four corners of said right array, the value of each power of ten number in each square space of said right array is determined by adding the power of ten number in the adjacent square space below said square space with the big number in the bottom square space of the same column as said square space;
   (d) excluding the power of ten numbers in the square spaces of said bottom row, each power of ten number in each square space of said right array is also presented in decimal form;

(D) wherein one of said arrays has said a equal to 2 and is a left array, comprising:
   (a) a plurality of square spaces; wherein each square space of the bottom row having numbers of different print sizes, wherein a big number is located at the center of each said square space and a plurality of small numbers in each said square space wherein each small number is in smaller print than said big number; wherein two powers of ten in two square spaces at the bottom right and bottom left corners of said left array being two big numbers;
   (b) each square space of said bottom row having a dot at the bottom right corner, a small number 1 at the top right corner, a small number at the top left corner wherein said small number at said top left corner being identical to the big number in same said square space, a small number in decimal form at the bottom left corner wherein said small number at said bottom left corner has a value equal to said big number minus one , and a dash between two small numbers at said top left corner and said top right corner in same said square space;
   (c) excluding the power of ten numbers in four square spaces at four corners of said left array, the value of each power of ten number in each square space of said left array is determined by adding the power of ten number in the adjacent square space below said square space with the big number in the bottom square space of the same column as said square space;
   (d) excluding the power of ten numbers in the square spaces of said bottom row, each power of ten number in each square space of said left array is also presented in decimal form;

(E) wherein one of said arrays has said a equal to 2 and is a top array, comprising:
   (a) a plurality of square spaces; wherein each square space of the outer right column having numbers of different print sizes, wherein a big number is located at the center of each said square space and a plurality of small numbers in each said square space wherein each small number is in smaller print than said big number; wherein two powers of ten in two square spaces at the bottom right and top right corners of said top array being two big numbers;
   (b) each square space of said outer right column having a dot at the bottom right corner, a small number 1 at the top right corner, a small number at the top left corner wherein said small number at said top left corner being identical to the big number in same said square space, a small number in decimal form at the bottom left corner wherein said small number at said bottom left corner has a value equal to said big number minus one, and a dash between two small numbers at said top left corner and said top right corner in same said square space;
   (c) excluding the power of ten numbers in four square spaces at four corners of said top array, the value of each power of ten number in each square space of said top array is determined by adding the power of ten number in the adjacent square space to the right of said square space with the big number in the outer right square space of the same row as said square space;
   (d) excluding the power of ten numbers in the square spaces of said outer right column, each power of ten number in each square space of said top array is also presented in decimal form;

(F) wherein four of said arrays have said a equal to −4, 0, 4, 0, and are bottom right, top right, top left, and bottom left arrays respectively, each of said arrays comprising a plurality of square spaces wherein each power of ten number in each square space is also presented in decimal form, wherein said power of ten number and the number in said decimal form in same said square space are used in mathematical operations;

(G) wherein said open spaces comprising:
   (a) a plurality of arrows, a plurality of mathematical symbols of addition and subtraction, a mathematical symbol of multiplication, and a mathematical symbol of division; wherein an arrow pointing to the left and a symbol of addition are paired together and located in the open space between said right array and said center array; wherein an arrow pointing to the top and another symbol of addition are paired together and located in the open space between said bottom array and said center array; wherein an arrow pointing to the right and a symbol of subtraction are paired together and located in the open space between said left array and said center array; wherein an arrow pointing to the bottom and another symbol of subtraction are paired together and located in the open space between said top array and said center array; wherein said symbol of multiplication is located among said bottom right, right, center, and bottom arrays; wherein said symbol of division is located among said center, top, top left, and left arrays;

(b) a sign formed by two short vertical and horizontal lines and located next to said symbol of division;

(c) a plurality of percentages of 100 and a plurality of percentages of 1, wherein a percentage of 100 and a percentage of 1 are paired together with a little horizontal line in between and located in the open space below the square space at the bottom right corner of said top array, wherein another percentage of 100 and another percentage of 1 are paired together with a little vertical line in between and located in the open space next to the right of the square space at the bottom right corner of said left array;

(d) a plurality of quotients; wherein each quotient resulted from 1 as dividend, with each big number in each square space of the outer right columns of said bottom, center, and top arrays as divisor, is placed in the open space next to the right of each said square space accordingly; wherein each quotient resulted from 1 as dividend, with each big number in each square space of the bottom rows of said right, center, and left arrays as divisor, is placed in the open space below each said square space accordingly; wherein each said quotient is presented in decimal form; wherein each said quotient, excluding the round quotients, has a plurality of digits to the right of a decimal point and a dash at the end of said quotient to replace repeating digits, and is not rounded off; wherein the quotient of said 1 as dividend with the big number 1 in the common square space of the outer right column and the bottom row of said center array as divisor is moved into said common square space and being the small number 1 at the top left corner of said common square space of said center array;

(e) a plurality of equations of a number of n with zero, $n+0=n$, $n-0=n$, $0 \times n=0$, $0/n=0$ and condition $n \neq 0$ for the latest equation; wherein said equations are placed in the open spaces next to said common square space of said center array.

10. The basic mathematics teaching and learning aid of claim 9 wherein said aid is constructed by a computer program whereby said aid is used with computer related devices.

11. The basic mathematics teaching and learning aid of claim 9 wherein said aid is made of a suitable material with predetermined length, height, and thickness whereby said aid is used for a group of users.

12. The basic mathematics teaching and learning aid of claim 9 wherein said aid is presented in braille.

* * * * *

UNITED STATES PATENT AND TRADEMARK OFFICE
CERTIFICATE OF CORRECTION

PATENT NO.   : 6,579,101 B2                                        Page 1 of 1
DATED        : June 17, 2003
INVENTOR(S)  : Que N. Phan It is certified that error appears in the above-identified patent and that said Letters Patent is hereby corrected as shown below:

<u>Column 2,</u>
Line 66, change "6-8=2" to -- 6=8-2 --
Line 66, after "from", insert -- addition and --

Signed and Sealed this

Sixth Day of April, 2004

JON W. DUDAS
*Acting Director of the United States Patent and Trademark Office*